(12) United States Patent
Relander et al.

(10) Patent No.: US 7,369,662 B2
(45) Date of Patent: *May 6, 2008

(54) MAINTAINING END-TO-END SYNCHRONIZATION ON A TELECOMMUNICATIONS CONNECTION

(75) Inventors: Rasmus Relander, Helsinki (FI); Raimo Kantola, Helsinki (FI)

(73) Assignee: Eads Secure Networks Oy (FI)

( * ) Notice: Subject to any disclaimer, the term of this patent is extended or adjusted under 35 U.S.C. 154(b) by 1256 days.

This patent is subject to a terminal disclaimer.

(21) Appl. No.: 09/993,947

(22) Filed: Nov. 27, 2001

(65) Prior Publication Data

US 2002/0066013 A1    May 30, 2002

(30) Foreign Application Priority Data

Nov. 28, 2000    (FI) .................................. 20002608

(51) Int. Cl.
*H04L 9/00* (2006.01)
(52) U.S. Cl. ...................... 380/261; 380/255; 380/256; 380/260; 380/261; 380/277; 380/280; 375/240.12; 375/242
(58) Field of Classification Search ............... 713/401; 709/231–237
See application file for complete search history.

(56) References Cited

U.S. PATENT DOCUMENTS

| 6,091,709 | A | 7/2000 | Harrison et al. |
| 6,658,027 | B1* | 12/2003 | Kramer et al. ............... 370/516 |
| 6,922,731 | B1* | 7/2005 | Morioka et al. ............ 709/231 |
| 7,076,064 | B2* | 7/2006 | Relander et al. ............ 380/247 |
| 2003/0202528 | A1* | 10/2003 | Eckberg ...................... 370/412 |

FOREIGN PATENT DOCUMENTS

| EP | 0 786 881 | 7/1997 |
| EP | 0 921 666 | 6/1999 |

OTHER PUBLICATIONS

ETSI, "Radio Equipment and Systems (RES); Trans-European Trunked Radio (TETRA); Packet Data Optimzed (PDO); Part 1: General Network Design" Apr. 1996, ESTI. Doccument ID ETS 300 393-1.*

(Continued)

*Primary Examiner*—Syed A. Zia
(74) *Attorney, Agent, or Firm*—Barnes & Thornburg LLP

(57) ABSTRACT

A method and an arrangement maintain end-to-end synchronization on a telecommunications connection transmitting data in frames substantially in real time and using synchronized end-to-end encryption, wherein at least a part of the telecommunications connection is a packet-switched connection, in which case the reproduction delay of the data to be transmitted can be increased by adding one or more extra frames to the frame string being transmitted, wherein the arrangement defines, based on the number of received frames, an initialization vector value corresponding to a frame received at the receiving end of the telecommunications connection and used in decrypting the frame, adjusts the reproduction delay to mark the frame to be added to increase the reproduction delay as an extra frame, and defines the initialization vector value to count only the frames not marked as extra frames in the number of received frames.

29 Claims, 3 Drawing Sheets

OTHER PUBLICATIONS

Figure 1:
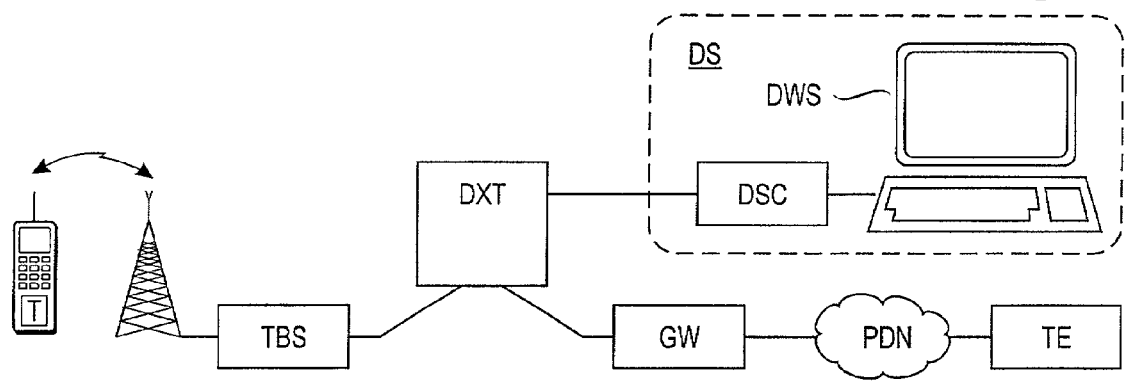

Uhlirz, Markus. "Concept of a GSM-based Communication System for High-Speed Trains" 1994. IEEE.*

Saltzer et al. "End-to-End Arguments in System Design," Jun. 1983. ACM Transaction on Computer Systems, vol. 2, No. 4 Nov. 1984. pp. 277-288.*

Newton, Harry. "Newton's Telecom Dictionary". Mar. 2005. United Business Media. 21st Edition, pp. 105, 524.*

Wikipedia. "Block cipher modes of operation" 2005, Wikipedia.org. http://en.wikipeda.org/wiki/Block_cipher_modes_of_ opera-tion.*

Lipmaa, H., Rogaway, P., and Wagner, D., "Comments to NIST concerning AES Modes of Operation: CTR-Mode Encryption," Manuscript, Oct. 2000. http://citeseer.ist.psu.edu/lipmaa00comments.html.*

Samarakoon et al., "Encrypted Video Over Tetra," IEEE Seminar on Tetra Market and Technology Developments, London, UK, Feb. 10, 2000, 5 pp.

Montgomery, "Techniques for Packet Voice Synchronization," IEEE Journal on Selected Areas in Communication, Vo. SAC-1, No. 6, Dec. 1983, 1022-1028.

* cited by examiner

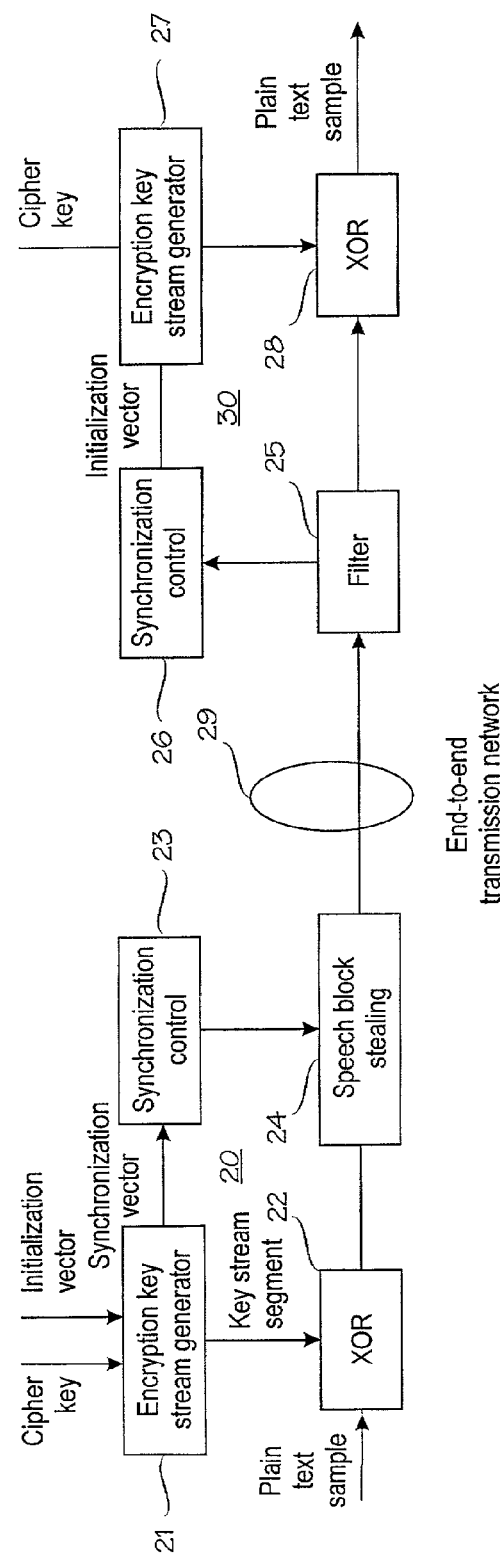

MAINTAINING END-TO-END SYNCHRONIZATION ON A TELECOMMUNICATIONS CONNECTION

BACKGROUND OF THE INVENTION

The invention relates to a method and apparatus for maintaining an end-to-end synchronization on a telecommunications connection.

In telecommunications systems, such as an official network, it is very important that electronic interception of the traffic is not possible. The air interface is typically encrypted, so even though the radio traffic is monitored, an outsider cannot decrypt it. In an infrastructure, the traffic is, however, not necessary encrypted, so the traffic, such as speech, can be decrypted using the code of the system in question. Even though an outsider cannot in principle listen to the speech flow inside the infrastructure, this is a possible security risk for the most demanding users. Therefore, a solution has been developed in which speech can be encrypted with end-to-end encryption. An example of a system enabling the end-to-end encryption is the TETRA (Terrestrial Trunked Radio) system.

The basic idea of end-to-end encryption is that a network user, such as an authority, can encrypt and decrypt traffic independently and regardless of the used transmission network for instance in terminal equipment.

In the TETRA system, for instance, when employing end-to-end encryption, the sender first codes a 60-ms voice sample using a TETRA code, thus creating a plaintext sample. The transmitting terminal creates an encrypted sample using a certain key stream segment. The encrypted sample is then transmitted to the network. The recipient decrypts the encrypted sample by using the same key stream segment, thus again obtaining a plaintext sample.

To prevent the encryption from being broken, the key stream segment is changed continuously, which means that each frame comprising a 60-ms voice sample is encrypted with its own key stream segment. Both encryption key stream generators should thus agree on what key stream segment to use for each frame. This task belongs to synchronization control. For the task, synchronization vectors are used that are transmitted between terminals by means of an in-band signal.

The encryption key stream generator generates a key stream segment on the basis of a certain key and an initialization vector. The keys are distributed to each terminal participating in the encrypted call. This is part of the terminal settings. A new key stream segment is thus generated once in every 60 milliseconds. After each frame, the initialization vector is changed. The simplest alternative is to increment it by one, but each encryption algorithm contains its own incrementation method that can be even more complex to prevent the breaking of the encryption.

The task of synchronization control is to make sure that both ends know the initialization vector used to encrypt each frame. For the encrypter and decrypter to agree on the value of the initialization vector, a synchronization vector is transmitted at the beginning of the speech item. In case of a group call, joining the call must be possible even during a speech item. Therefore, the synchronization vector is transmitted continuously for instance 1 to 4 times a second. In addition to the initialization vector, the synchronization vector contains for instance a key identifier and CRC error check so that the terminal can verify the integrity of the synchronization vector. The recipient thus counts the number of frames transmitted after the synchronization vector and the encryption key stream generator generates a new initialization vector on the basis of the initialization vector received last and the number of frames.

A data transmission network may comprise one or more packet-switched connections, for instance IP (Internet Protocol) connections, in which data is transmitted using the voice over IP technology, for instance. RTP (Real Time Protocol) is one standard protocol for transmitting real-time data, such as sound and video images in an IP network, for instance. The IP network typically causes a varying delay in packet transmission. For speech intelligibility, for instance, a varying delay is very deleterious. To compensate for this, the receiving end of the RTP transmission buffers incoming packets to a jitter buffer and reproduces them at a given reproduction time. A packet arriving before the reproduction time participates in the reconstruction of the original signal. A packet arriving after the reproduction time remains unused and rejected.

On one hand, a real-time application requires an as short end-to-end delay as possible, and consequently the reproduction delay should be reduced. On the other hand, a long reproduction delay allows a long time for the packets to arrive and thus, more packets can be accepted. The value of the reproduction delay should thus be adjusted continuously according to the network conditions. Most RTP algorithms have a facility that adjusts the reproduction delay automatically according to the network conditions to improve sound quality. The reproduction delay can be shifted 60 ms forward, for instance, by having the IP gateway create a 60-ms replacement packet. In other words, an extra frame is added to the frame flow being transmitted.

A problem with the arrangement described above is that if synchronized end-to-end encryption coding is used and an extra frame is added to the frame flow, the result is that the frame counter at the receiving end is one frame ahead in relation to the incoming frames and the key stream segment of the receiving end no longer matches the key stream segment of the transmitting end.

Increasing the reproduction delay in the middle of a speech item, for instance, thus has the consequence that end-to-end synchronization is lost and the encrypted speech can no longer be decoded. This continues until the transmitting end sends a new synchronization vector to synchronize the receiving end. This phenomenon can be prevented in such a manner that in semi-duplex calls, for instance, the reproduction delay is changed only after speech items. If the speech items are long, the reproduction delay can then be changed disadvantageously infrequently: the quality of speech may be poor until the end of the entire speech item, because the reproduction delay cannot be changed earlier. Further, in duplex calls, for instance, in which there are no speech items and the terminal transmits continuously, the reproduction delay cannot be changed at all during the call, if loss of synchronization is to be avoided.

BRIEF DESCRIPTION OF THE INVENTION

It is thus an object of the invention to develop a method and an apparatus implementing the method so as to solve the above-mentioned problems. The object of the invention is achieved by a method and system that are characterized by what is stated in the independent claims 1, 7, 13, and 22. Preferred embodiments of the invention are disclosed in the dependent claims.

The invention is based on the idea that if the reproduction delay is increased during a data transmission, such as speech item or call, the frame added to increase the reproduction delay is marked as an extra frame and only the frames not marked as extra frames are counted in the number of frames received at the receiving end, in which case the extra frames added to increase the reproduction delay will not mix up the frame counter used in end-to-end encryption and there will be no gaps in decryption or decoding.

The method and system of the invention provide the advantage that they also enable the increasing of the reproduction delay during data transmission without causing a disruption in the decoding of the encrypted data.

BRIEF DESCRIPTION OF THE INVENTION

Figure 3:
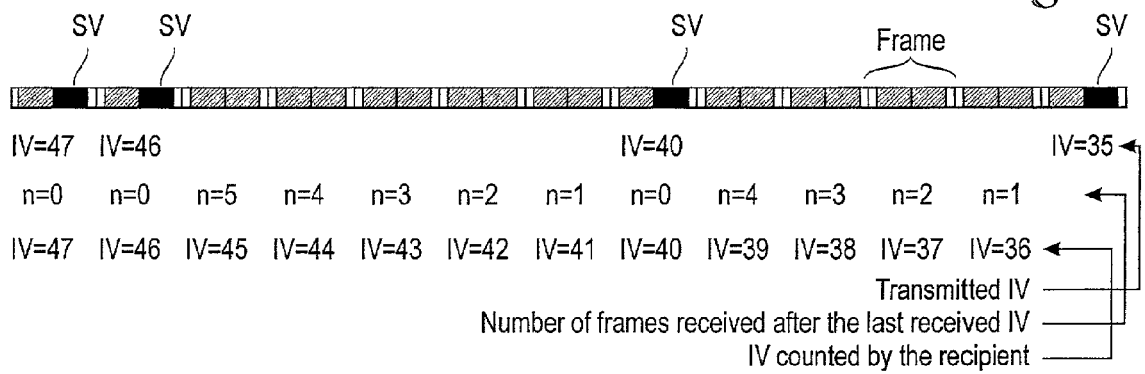
Figure 4:
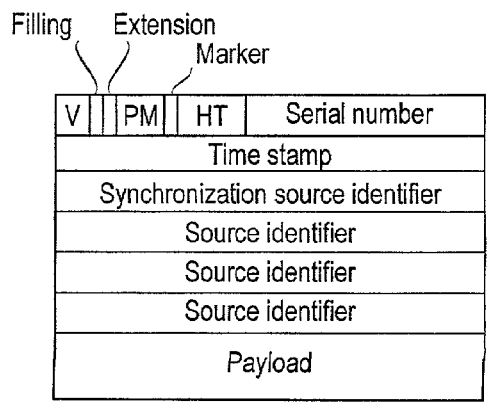
Figure 5:
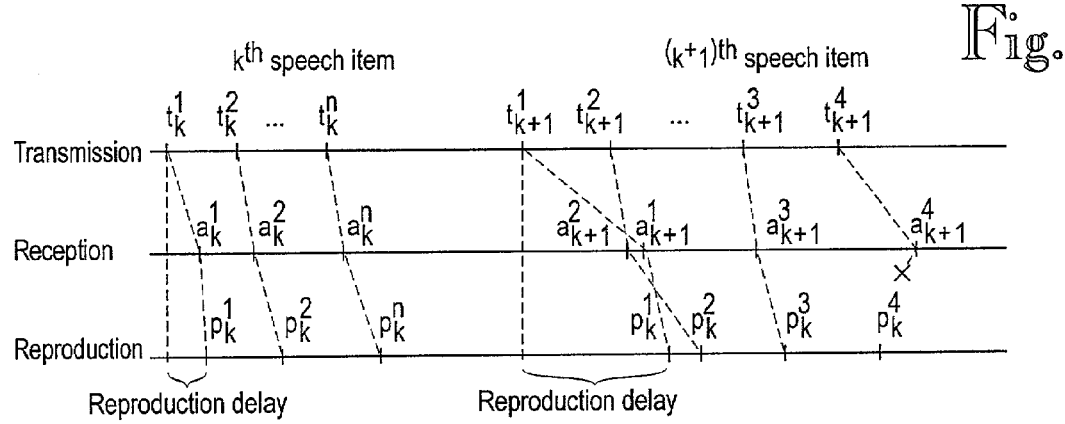
Figure 6:
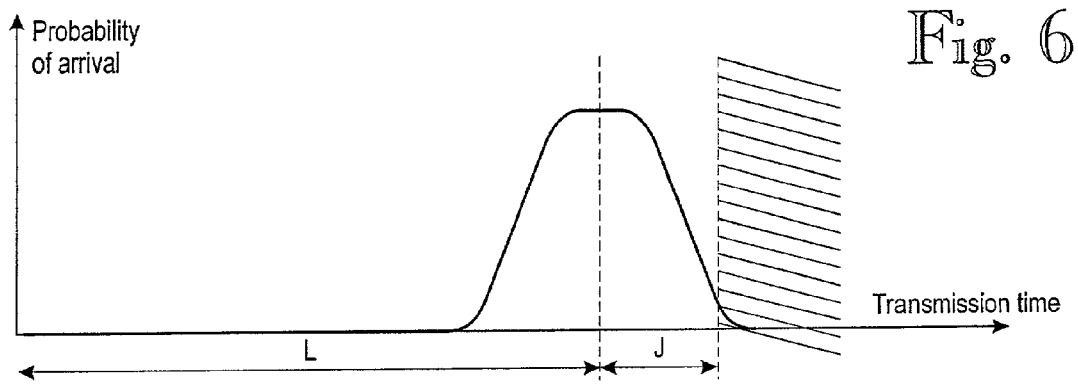
Figure 7:
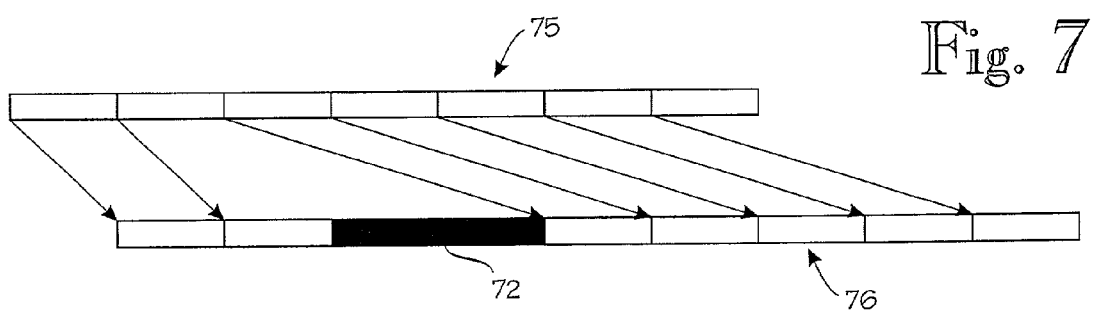

The invention will now be described in greater detail by means of preferred embodiments and with reference to the attached drawings in which FIG. 1 shows a block diagram of the structure of a TETRA system, FIG. 2 shows a block diagram of the operation of end-to-end encryption, FIG. 3 shows the calculation of an initialization vector by the recipient, FIG. 4 shows a diagram of the structure of an RTP packet, FIG. 5 shows the operation of an RTP algorithm, FIG. 6 shows a diagram of the probability of arrival of RTP packets as a function of the transmission time, and FIG. 7 shows a diagram of increasing the reproduction delay.

DETAILED DESCRIPTION OF THE INVENTION

In the following, the invention will be described by way of example in a TETRA system. The intention is, however, not to restrict the invention to a given telecommunications system or data transmission protocol. The application of the invention to other systems is apparent to a person skilled in the art.

FIG. 1 shows an example of the structure of the TETRA system. Even though the figure and the following description refer to network elements according to the TETRA system, this does not in any way restrict the application of the invention to other telecommunications systems. It should be noted that the figure only shows the elements essential for understanding the invention, and the structure of the system can differ from what is stated without it having any significance to the basic idea of the invention. It should also be noted that an actual mobile system could comprise an arbitrary number of each element. Mobile stations MS are connected to TETRA base stations TBS over a radio path. The mobile stations MS can also use a direct mode to communicate with each other without using the base stations TBS. Each base station TBS is connected over a connecting line to one of the digital exchanges for TETRA DXT of the fixed transmission network. The TETRA exchanges DXT are connected over a non-switched connection to other exchanges and to a TETRA node exchange DXTc (digital central exchange for TETRA, not shown) that is an exchange to which other exchanges DXT and/or other node exchanges DXTC are connected to provide alternative traffic routes. Possible external connection interfaces to a public switched telephone network PSTN, integrated services digital network ISDN, private automatic branch exchange PABX and packet data network PDN can reside in one or more exchange DXT. Of the above-mentioned connection interfaces, the figure shows a connection to a packet data network PDN through a gateway GW. The task of the gateway GW is to convert the circuit-switched data coming from the exchange DXT into packet-switched data for the packet data network PDN and vice versa. This way, terminal equipment TE connected to a packet-switched data network PDN can communicate with the TETRA network. The gateway GW can be a separate network element or part of the exchange DXT, for instance. In addition, the figure shows a dispatcher system DS connected to the exchange DXT and made up of a dispatcher station controller DSC and a dispatcher workstation DWS connected to it. The administrator of the dispatcher system controls the calls and other functions of the mobile stations MS through the workstation DWS.

FIG. 2 illustrates the operation of end-to-end encryption. When using end-to-end encryption, the sender 20 first codes a 60-ms voice sample using a TETRA code that produces a plaintext sample (P). The terminal creates a key stream segment KSS having the length of P in an encryption key stream generator 21. An encrypted sample (C) is obtained by executing a binary XOR operation in block 22:

$$C = P \text{ xor } KSS$$

The encrypted sample is then transmitted to a transmission network 29. A recipient 30 executes the same XOR operation in block 28 by using the same key stream segment that again produces a plaintext sample P:

$$P = C \text{ xor } KSS$$

To prevent the breaking of the encryption, the key stream segment KSS is changed continuously, and each frame is encrypted by its own key stream segment. Both encryption key stream generators 21 and 27 should thus agree on which key stream segment to use for each frame. This is a task of synchronization control 23 and 26. For the task, synchronization vectors transmitted between the terminals by means of an in-band signal are used.

The encryption key stream generator (EKSG) 21 and 27 generates the key stream segment (KSS) on the basis of a cipher key (CK) and an initialization vector (IV). A new key stream segment is thus generated once for every 60 ms.

$$KSS = EKSG (CK, IV)$$

The initialization vector is changed after each frame. The simplest alternative is to increment it by one, but each encryption algorithm contains its own incrementation method that can be even more complex to prevent the breaking of the encryption.

The task of synchronization control 23 and 26 is to make sure that both ends 20 and 30 know the initialization vector used to encrypt each frame. For the encrypter 20 and decrypter 30 to agree on the value of the initialization vector, a synchronization vector (SV) is transmitted at the beginning of the speech item. In case of a group call, joining must be possible even during a speech item. Therefore, the synchronization vector is transmitted continuously approximately 1 to 4 times a second. In addition to the initialization vector, the synchronization vector contains for instance a key identifier and CRC error check so that the terminal can verify the integrity of the synchronization vector.

The recipient 30 thus counts the number (n) of frames transmitted after the synchronization vector. The encryption key stream generator 27 of the recipient 30 generates a new initialization vector IV on the basis of the initialization vector received last and the number of frames. The initialization vector IV counting performed by the recipient is illustrated in FIG. 3 that shows a frame string to be transmitted. Each frame comprises two speech blocks P1 and P2, as shown in the figure for one frame. In the presented string, frames 1, 6, 12 and 13 contain in their second speech block the synchronization vector SV that indicates the number of the initialization vector IV.

Both ends 20 and 30 should agree on how to encrypt a call. The synchronization control units 23 and 26 at both ends communicate with each other by means of U-stolen speech blocks. The transmitting terminal utilizes one or two speech blocks inside the frame for its own purpose. This takes place in block 24. This is indicated to the receiving terminal by setting first 3 control bits appropriately inside the frame. This way, the infrastructure 29 understands that this is terminal-to-terminal data and, on the basis of it, it transmits the data transparently without changing it. In addition, the receiving terminal detects that there is no speech data in the speech block in question and does not forward them to the code, but processes them appropriately (in other words, the synchronization control data is filtered to the synchronization control 26 in block 25) and generates a replacement sound to replace the stolen speech. Stealing a speech block destroys 30 ms of speech. This would cause a break in speech, thus reducing its quality and making it more difficult to understand. To avoid this, the TETRA code contains a replacement mechanism. In reality, a user does not experience the missing speech as inconvenient, unless speech blocks are stolen more than 4 times a second. The cipher keys CK are distributed to each terminal taking part in the encrypted call. This is part of the settings of the terminals.

The packet-switched data network PDN shown in FIG. 1 can for instance be the Internet that uses TCP/IP protocols. TCP/IP is the name of a family of data transmission protocols used in a local area network or between local area networks. The protocols are IP (Internet Protocol), TCP (Transmission Control Protocol, and UDP (User Datagram Protocol). The family also contains other protocols intended for certain services, such as file transfer, e-mail, remote operation, etc.

TCP/IP protocols are divided into layers: data link layer, network layer, transport layer and application layer. The data link layer is responsible for the physical connection of a terminal to the network. It is mainly associated with the network interface card and driver. The network layer is often called the Internet or IP layer. This layer is responsible for transmitting packets inside the network and for instance for the routing from one device to another on the basis of an IP address. IP provides the network layer in the TCP/IP protocol family. The transport layer provides a data flow service between two terminals for the application layer and directs the flows into the correct application in the terminal. The Internet protocol has two transfer protocols: TCP and UDP. A second task of the data link layer is to direct packets to the correct applications on the basis of port numbers. TCP provides a reliable data flow from one terminal to another. TCP chops data into suitable packets, acknowledges received packets and monitors that transmitted packets are acknowledged as received by the other end. TCP is responsible for a reliable transfer from end to end, i.e. the application need not take care of it. UDP, on the other hand, is a much simpler protocol. UDP is not responsible for the arrival of data, and if this is required, the application layer must take care of it. The application layer is responsible for the data processing of each application.

RTP is a standard Internet protocol for transferring real-time data, such as sound and video images. It can be used for media order services or interactive services, such as IP calls. RTP is made up of a media part and a control part. The latter is called RTCP (Real Time Control Protocol). RTP's media part contains support for real-time applications. This includes time support, loss detection, security support and content identification. RTCP enables real-time conferences within groups of different sizes and the evaluation of the end-to-end service quality. It also supports the synchronization of several media flows. RTP is designed to be independent of the transmission network, but in the Internet, RTP generally uses IP/UDP. The RTP protocol has many features that enable a real-time end-to-end data transmission. At each end, an audio application transmits regularly small samples of audio data that can be 30 ms long, for instance. An RTP header is attached to each sample. The RTP header and the data are packed in a UDP and IP packet.

The content of a packet is identified in the RTP header. The value of this field indicates which coding method is used (PCM, ADPCM, LPC, etc.) in the payload of the RTP packet. In the Internet, as in other packet networks, packets can arrive in an arbitrary order, be delayed for a varying time, or even disappear completely. To prevent this, each packet in a certain flow is given its own sequence number and time stamp, on the basis of which the received flow arranges itself according to the original flow. The sequence number is increased by one for each packet. By means of the sequence number, the recipient is able to detect a missing packet and also evaluate packet loss.

The time stamp is a 32-bit number. It indicates the starting moment of sampling. To calculate it, a clock increasing monotonously and linearly with time is used. The frequency of the clock should be selected in such a manner that it is suitable for the content, fast enough for calculating jitter and to enable synchronization. For instance, when using the PCM-A law converting method, the clock frequency is 8000 Hz. When transmitting 240 byte RTP packets, which corresponds to 240 PCM samples, the time stamp is increased by 240 for each packet. The length of an RTP header is 3 to 18 words (32-bit word). FIG. 4 illustrates the form of an RTP packet. The meanings of the fields are as follows. V=version, the used RTP version, currently 2. Filling=the packet includes filling bits, the last bit indicates how many. Extension=exactly one header extension after the packet. PM=the number of service sources indicates the number of data sources in the packet. A marker can be used to indicate significant events, such as frame borders. HT=the type of payload indicates the type of media in the payload. The serial number is increased by one for each transmitted data packet. It helps detect packet loss and disorder. The initial value is random. The time stamp indicates the sampling moment of the first byte. It is used for synchronization and jitter calculation. The initial value is random. SSRC=a randomly selected identifier of the synchronization source. Indicates the joining point of sources or the original sender, if there is only one source. CSRC list is the list of sources in this packet.

The Internet causes a varying delay in the transfer of audio packets. For speech intelligibility, a varying delay is very deleterious. To compensate for this, the receiving end of RTP buffers incoming packets to a jitter buffer and reproduces them at a given reproduction time. A packet arriving before the reproduction time participates in the reconstruction of the original signal. A packet arriving after the reproduction time remains unused and rejected.

FIG. 5 illustrates the operation of an RTP algorithm. In the figure, the letter t refers to the transmission time of the packet, the letter a to the reception time and p to the reproduction time. Superscripts indicate the number of the packet and subscripts the number of the speech item. In the K$^{th}$ speech item, the packets arrive at the receiving end after a varying transmission. time. The RTP algorithm then reproduces them at the correct moment. In the (K+1)$^{th}$ speech item, packets 1 and 2 change their order and packet 4 arrives after its reproduction time, and is thus rejected. The RTP algorithm returns the packets to the correct order, reproduces them at the correct moment and indicates for corrective action, for instance, which packets are missing or are late. The reproduction delay is time t(reproduction delay)=t(reproduction)–t(transmission). The RTP algorithm makes sure that the reproduction delay remains constant during the entire speech item.

The delay of the IP packet through the IP network t=t(input)–t(output) is made up of two factors. L is a fixed delay that depends on the transmission time and the average queue time. J is a varying delay that depends on a varying queue time inside the IP network and causes jitter. The receiving end of the IP network has a jitter buffer that stores the packets in its memory, if the transmission time t<t (reproduction delay). Determining the reproduction delay is a compromise solution. On one hand, a real-time application requires an as short end-to-end delay as possible, and consequently the reproduction delay should be reduced. On the other hand, a long reproduction delay allows a long time for the packets to arrive and thus, more packets can be accepted. The value of the reproduction delay should thus be adjusted continuously according to the network conditions. FIG. 6 illustrates this. A packet having a transmission time t<L+J can be accepted, whereas a packet having a transmission time t>L+J is rejected. By increasing J, it is thus possible to increase the number of accepted packets. The reproduction delay can be adjusted for instance by starting with a small value and increasing it regularly until the proportion of late packets is below a certain limit, for instance 1%.

Most RTP algorithms have a facility that adjusts the reproduction delay automatically according to the network conditions to improve sound quality. The reproduction delay can be shifted 60 ms forward, for instance, in such a manner that a 60-ms replacement speech packet is created in RTP reception before the speech flow continues. In other words, an extra frame is added to the speech flow. FIG. 7 shows a frame string 75 to which one or more extra frames 72 are added to obtain a frame string 76 for onward transmission. The reproduction delay can be shifted 60 ms backward in such a manner that an entire speech frame is deleted in RTP reception.

In FIG. 1, RTP transmission thus takes place between the gateway GW and terminal equipment TE over the packet network PDN. The task of the gateway GW is to convert the circuit-switched speech (or other data) coming from the exchange DXT over the PCM line into IP speech packets and vice versa. In the TETRA infrastructure, speech data is transmitted in frames, so a natural RTP packet would contain one frame of speech data. One RTP packet would then contain 60 ms speech and it would correspond directly to the content of one speech frame. Another possibility is to use an RTP packet containing only half a frame of speech data (30 ms). A half-frame packet has the following properties as compared with a complete-frame packet: 1) When the gateway receives half-frame packets, it has to wait for two packets to arrive before the start of an ISI-frame transmission. The control bits (BFI, C- or U-stolen) concerning both speech blocks are namely at the beginning of the frame and the gateway must define them on the basis of the type of the half-frame packets. 2) When an RTP packet is lost, only 30 ms of speech is missing as opposed to 60 ms. When optimizing speech quality, the length of the packet is a compromise between two viewpoints. One extreme is a short packet, as a result of which the number of missing packets increases in an inversely proportional manner to the size of the packets, and distortions then occur more often. The other extreme is a long packet in which distortions occur more rarely, but which has a probability of losing an entire phoneme, and therefore, the intelligibility of speech becomes poorer especially when the length of the packet is over 20 ms. The latter limit is namely the shortest length of a phoneme. 3) For bandwidth, a long packet is, however, more efficient, since the length (36 to 40 bytes) of the headers (Ethernet+IP+UDP+RTP) is already long in comparison with the length of the payload (18 bytes/speech block or 36 bytes/speech frame). The share of the headers in a packet can be reduced by two techniques. Multiplexing allows several speech channels to be packed in one RTP packet, thus reducing the share of the headers. This is a suitable solution for an exchange-to-dispatching point connection, since this way, all group calls and an individual call can be transmitted in one packet. A second technique that is suitable for serial connections, is compression of the headers. This way, the IP/UDP/RTP header can be shortened considerably (2 to 4 bytes), thus saving bandwidth. To achieve a better sound quality, a short RTP packet (30 ms), is therefore, more preferable.

Speech blocks can be stolen from a frame for use by the network (C-stolen) or user (U-stolen). For instance, when using end-to-end encryption, terminals steal one speech block for their own purpose 1 to 4 times a second for the transmission of the synchronization vector, as described above.

The RTP standard and many IP speech terminals support ACELP codecs, but the RTP standard does not support the TETRA-specific ACELP. An RTP packet with the following settings, for instance, can be used for speech transmission: RTP version 2, no filling, no extension, no CRSC sources, no marker, payload type 8 (same as A law), time stamp increases by 240 units for each packet. This corresponds to the TETRA 8000-Hz sampling clock and 30-ms sample length. The payload contains the following data: the first three bits indicate, if the frame error bit (BFI) is set, if the payload is sound or data, and if this is a C- or U-stolen speech block; other first-byte bits are not used; the next 137 bits are the actual data and correspond to one speech block. The remaining payload bits are 0.

The above operation of the gateway GW between a circuit-switched and a packet-switched connection is only one possible alternative, and the operation of the gateway GW can differ from it without having any significance to the basic idea of the invention.

The terminal equipment TE shown in FIG. 1 can be a speech terminal or data terminal, and the invention can be applied to audio connections, video connections, or data connections that require real-time data transmission. The terminal equipment TE can be a mobile station, a dispatcher workstation, base station or some other network element. The terminal equipment TE is not necessarily directly connected to the packet network PDN, but between the terminal equipment TE and the packet network PDN, there may be a second TETRA network, for instance. In such a case, the other end of the packet connection PDN also has a gateway element. There may also be another connection or several packet connections in between. If the terminal equipment TE is, as shown in FIG. 1, connected directly to the packet network PDN, it acts as the other party of the RTP transmission essentially in the same manner as described above with reference to the gateway GW.

According to the invention, the reproduction delay is increased in the receiving end GW or TE of the packet connection PDN during a data transmission, for instance speech item or call, in such a manner that the frame 72 to be added to increase the reproduction delay is marked as an extra frame, and further, in the receiving end of the telecommunications connection, only the frames not marked as extra frames are counted in the number n of received frames so as to obtain the correct value of the initialization vector, as described above. As an example, let us examine the following situation of FIG. 1 in which there is a call between the mobile station MS and terminal equipment TE over the packet connection PDN according to the RTP protocol. Data transmission according to the RTP protocol then takes place between the gateway GW and the terminal equipment TE supporting the protocol. The gateway GW is then the receiving end of the packet connection PDN with respect to the traffic coming from the terminal equipment TE. When a need is detected according to the RTP algorithm to increase the reproduction delay, one or more extra frames 72 are added in the gateway GW to the received frame string 75 and the thus obtained frame string 76 is transmitted on to the mobile station MS. The added extra frames 72 are also marked in the gateway GW in such a manner that the recipient, i.e. in this case the mobile station MS, recognizes them as extra frames and does not count them in the number n of received frames. Thus, the encryption algorithm of the mobile station MS keeps the correct synchronization. The terminal equipment TE, which is the receiving end of the packet connection PDN with respect to the traffic coming from the mobile station MS, marks correspondingly any extra frames 72 possibly added to increase the reproduction delay. This way, it is possible to identify in the frame string to be forwarded next to decryption and reproduction the extra frames that are not counted in the number n of received frames. The control of the reproduction delay in the terminal equipment TE is thus done before the filter block 25 in FIG. 2. A frame to be added to increase the reproduction delay can be marked as extra in a manner agreed in advance. The manner of the marking is not significant for the basic idea of the invention. The most important thing is that the receiving party of the telecommunications connection can identify the extra frames. The marking can be done for instance using a special parameter reserved for this purpose that is transmitted in the C-stolen second speech block of the extra frame 72. Each extra frame can be marked or, if several extra frames are transmitted one after the other, it is also possible to mark only the first extra frame and indicate the number of extra frames following it.

It is obvious to a person skilled in the art that while technology advances, the basic idea of the invention can be implemented in many different ways. The invention and its embodiments are thus not restricted to the examples described above, but can vary within the scope of the claims.

The invention claimed is:

1. A method for maintaining end-to-end synchronization on a telecommunications connection transmitting data in frames in real time and using synchronized end-to-end encryption, wherein an initialization vector value corresponding to a received frame and used in decrypting the frame is defined on the basis of the number of frames received at the receiving end of the telecommunications connection, and wherein at least a part of the telecommunications connection is a packet-switched connection, the method comprising:

increasing the reproduction delay of the data being transmitted by adding one or more extra frames to the frame string being transmitted;

marking a frame to be added to increase the reproduction delay as an extra frame; and counting only the frames not marked as extra frames in the number of received frames.

2. A method as claimed in claim 1, wherein the reproduction delay is increased in the receiving end of the packet-switched connection.

3. A method as claimed in claim 1, wherein the packet-switched connection uses an Internet protocol.

4. A method as claimed in claim 1, wherein the telecommunications connection belongs to the TETRA system.

5. A method as claimed in claim 1, wherein the extra frame added to increase the reproduction delay comprises a stolen speech block, and said marking is done in the stolen speech block.

6. A method as claimed in claims 1, wherein the encryption is done using a key stream segment generated using the initialization vector.

7. An arrangement for maintaining end-to-end synchronization on a telecommunications connection transmitting data in frames in real time and using end-to-end encryption, wherein at least a part of the telecommunications connection is a packet-switched connection, the arrangement comprising:

means for adjusting the reproduction delay arranged to increase the reproduction delay of the data being transmitted by adding one or more extra frames to the frame string being transmitted; and means for defining on the basis of the number of received frames an initialization vector value corresponding to a frame received at the receiving end of the telecommunications connection and used in decrypting the frame; wherein the means for adjusting the reproduction delay are arranged to mark the frame to be added to increase the reproduction delay as an extra frame, whereby the means for defining the initialization vector value are arranged to count only the frames not marked as extra frames in the number of received frames.

8. An arrangement as claimed in claim 7, wherein the means for adjusting the reproduction delay reside in the receiving end of the packet-switched connection.

9. An arrangement as claimed in claim 7, wherein the packet-switched connection uses an Internet protocol.

10. An arrangement as claimed in claim 7, wherein the telecommunications connection belongs to the TETRA system.

11. An arrangement as claimed in claim 7, wherein the extra frame added to increase the reproduction delay comprises a stolen speech block, and the means for adjusting the reproduction delay are arranged to do said marking in the stolen speech block.

12. An arrangement as claimed in claim 7, wherein the encryption is done using a key stream segment generated using the initialization vector.

13. A network element for maintaining end-to-end synchronization on a telecommunications connection transmitting data in frames in real time and using end-to-end encryption, wherein an initial corresponding to a received frame and used in decrypting the frame is defined on the basis of the number of frames received at the receiving end of the telecommunications connection, and wherein at least a part of the telecommunications connection is a packet-switched connection, the network element being arranged;

to increase the reproduction delay of the data being transmitted by adding one or more extra frames to the frame string being transmitted, and to mark the frame added to increase the reproduction delay as an extra frame.

14. A network element as claimed in claim 13, wherein the network element resides in the receiving end of the packet-switched connection.

15. A network element as claimed in claim 13, wherein the extra frame added to increase the reproduction delay comprises a stolen speech block, and the network element is arranged to do said marking in the stolen speech block.

16. A network element as claimed in claim 13, wherein the packet-switched connection uses an Internet protocol.

17. A network element as claimed in claim 13, wherein the telecommunications connection belongs to the TETRA system.

18. A network element as claimed in claim 13, wherein the encryption is done using a key stream segment generated using the initialization vector.

19. A network element as claimed in claim 17 or 18, wherein the network element is a TETRA dispatcher workstation.

20. A network element as claimed in claim 13, wherein the network element is a base station.

21. A network element as claimed in claim 13, wherein the network element is a gateway.

22. A network element for use in a telecommunications connection transmitting data in frames in real time and using a synchronized end-to-end encryption, wherein at least a part of the telecommunications connection is a packet-switched connection, in which case the reproduction delay of the data being transmitted can be increased by adding one or more extra frames to the frame string being transmitted, the network element being arranged:

to define on the basis of the number of received frames an initialization vector value corresponding to a received frame and used in decrypting the frame, and when the frames added to increase the reproduction delay are marked as extra frames, to count in the number of received frames only the frames that are not marked as extra frames added to increase the reproduction delay.

23. A network element as claimed in claim 22, wherein the extra frame added to increase the reproduction delay comprises a stolen speech block, and said marking is in the stolen speech block.

24. A network element as claimed in claim 22, wherein the packet-switched connection uses an Internet protocol.

25. A network element as claimed in claim 22, wherein the telecommunications connection belongs to the TETRA system.

26. A network element as claimed in claim 22, wherein the encryption is done using a key stream segment generated using the initialization vector.

27. A network element as claimed in claim 25 or 26, wherein the network element is a TETRA dispatcher workstation.

28. A network element as claimed in claim 22, wherein the network element is a base station.

29. A network element as claimed in claim 22, wherein the network element is a mobile station.

* * * * *